United States Patent
Chen et al.

(10) Patent No.: US 12,198,155 B2
(45) Date of Patent: *Jan. 14, 2025

(54) TRAINING A MODEL TO PREDICT LIKELIHOODS OF USERS PERFORMING AN ACTION AFTER BEING PRESENTED WITH A CONTENT ITEM

(71) Applicant: Maplebear Inc., San Francisco, CA (US)

(72) Inventors: Changyao Chen, New York, NY (US); Peng Qi, Menlo Park, CA (US); Weian Sheng, Foster City, CA (US)

(73) Assignee: Maplebear Inc., San Francisco, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 18/112,438

(22) Filed: Feb. 21, 2023

(65) Prior Publication Data

US 2023/0196389 A1 Jun. 22, 2023

Related U.S. Application Data

(63) Continuation of application No. 17/343,026, filed on Jun. 9, 2021, now Pat. No. 11,593,819.

(51) Int. Cl.
*G06Q 10/00* (2023.01)
*G06N 3/047* (2023.01)
(Continued)

(52) U.S. Cl.
CPC ......... *G06Q 30/0201* (2013.01); *G06N 3/047* (2023.01); *G06N 3/084* (2013.01); *G06Q 30/0206* (2013.01)

(58) Field of Classification Search
None
See application file for complete search history.

(56) References Cited

U.S. PATENT DOCUMENTS 11,270,159 B1 * 3/2022 Gao .................. G06F 18/24
11,443,120 B2 * 9/2022 Poddar ............. G06F 40/253
(Continued)

OTHER PUBLICATIONS

Al-Masri, Anas, HowDoesBack-PropagationinArtificialNeuralNetworksWork?,Jan. 29, 2019,httos://towardsdatascience.com/how-does-back-propagation-in-artificial-neural-networks-work-c7cad873ea7,p. 1-13. (Year: 2019).*

(Continued)

*Primary Examiner* — Joseph M Waesco
(74) *Attorney, Agent, or Firm* — Fenwick & West LLP

(57) ABSTRACT

An online concierge system trains a user interaction model to predict a probability of a user performing an interaction after one or more content items are displayed to the user. This provides a measure of an effect of displaying content items to the user on the user performing one or more interactions. The user interaction model is trained from displaying content items to certain users of the online concierge system and withholding display of the content items to other users of the online concierge system. To train the user interaction model, the user interaction model is applied to labeled examples identifying a user and value based on interactions the user performed after one or more content items were displayed to the user and interactions the user performed when one or more content items were not used.

20 Claims, 5 Drawing Sheets

(51) Int. Cl.
  *G06N 3/084*   (2023.01)
  *G06Q 30/0201*  (2023.01)

(56) References Cited

U.S. PATENT DOCUMENTS

| | | | | |
|---|---|---|---|---|
| 11,445,252 | B1* | 9/2022 | Kim | H04N 21/2405 |
| 2017/0154259 | A1* | 6/2017 | Burr | G06N 3/065 |
| 2019/0042945 | A1* | 2/2019 | Majumdar | G06N 3/045 |
| 2019/0080019 | A1* | 3/2019 | Young | G06F 16/9537 |
| 2019/0095796 | A1* | 3/2019 | Chen | G06N 3/045 |
| 2019/0102694 | A1* | 4/2019 | Yates | G06N 3/045 |
| 2019/0147342 | A1* | 5/2019 | Goulding | G06N 3/044 |
| | | | | 706/25 |
| 2019/0335006 | A1* | 10/2019 | George | G09B 5/065 |
| 2020/0104697 | A1* | 4/2020 | Bhatia | G06N 3/04 |
| 2020/0151570 | A1* | 5/2020 | Ravi | G06N 3/048 |
| 2020/0202195 | A1* | 6/2020 | Patel | G06F 7/485 |
| 2020/0311585 | A1* | 10/2020 | Helenius | G06N 5/01 |
| 2021/0117214 | A1* | 4/2021 | Presant | H04L 67/535 |
| 2021/0117623 | A1* | 4/2021 | Aly | G06F 40/295 |
| 2021/0117712 | A1* | 4/2021 | Huang | H04L 51/52 |
| 2021/0118440 | A1* | 4/2021 | Peng | G06Q 10/00 |
| 2022/0139535 | A1* | 5/2022 | Kushnir | G16H 50/70 |
| | | | | 705/2 |

OTHER PUBLICATIONS

Al-Masri, A. "How Does Back-Propagation in Artificial Neural Networks Work?" towardsdatascience.com, Jan. 29, 2019, pp. 1-13, Retrieved from the internet <URL: https://towardsdatascience.com/how-does- back-propagation-in-artificial-neural-networks-work-c7cad873ea7>.

* cited by examiner

TRAINING A MODEL TO PREDICT LIKELIHOODS OF USERS PERFORMING AN ACTION AFTER BEING PRESENTED WITH A CONTENT ITEM

CROSS REFERENCE TO RELATED APPLICATION

This application is a continuation of U.S. application Ser. No. 17/343,026, filed Jun. 9, 2021, which is incorporated by reference in its entirety

BACKGROUND

This disclosure relates generally to displaying content items to users, and more specifically to training a model to predict a likelihood of a user performing an action after displaying a content item to a user.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in the user order in a warehouse.

Additionally, an online concierge system may display content items to its users to encourage or to entice the users to perform various interactions. For example, an online concierge system displays content items describing items offered by one or more warehouses to users to encourage the users to include the items in orders placed through the online concierge system. However, displaying content items to users often has varying levels of effectiveness in encouraging users to subsequently perform one or more interactions. These varying levels of effectiveness in encouraging user interactions may result in inefficient use of resources for displaying content items to users by displaying content items to users that have low likelihoods of encouraging user interactions. Further, such display of content items to users who are unlikely to be enticed to perform interactions by the content items may discourage subsequent interactions with the online concierge system by the users to whom the content items were displayed.

SUMMARY

An online concierge system obtains content items for display to users of the online concierge system. The content items may be received from one or more third party systems external to the online concierge system (e.g., a website in a domain different from a domain of the online concierge system, such as a website corresponding to a warehouse) or may be generated by the online concierge system. For example, a content item from a third party system identifies a warehouse and an item for purchase from the warehouse. In another example, the online concierge system generates content items for one or more items offered for purchase from a warehouse. A content item may include one or more prompts for the user to perform one or more interactions with the online concierge system. Example interactions include adding an item identified by the content item to an order, viewing information about an item identified by the content item, accessing a warehouse corresponding to the order, or any other suitable interaction by the user with the online concierge system.

The online concierge system presents content items to users to entice or to encourage the users to perform interactions. For example, the online concierge system displays a content item identifying an item offered by a warehouse to encourage the user to include the item in an order. However, different users differently respond to being presented with content items, with certain users more likely to perform interactions after being presented with content items than other users. Similarly, different content items may have different amounts of influence on users.

To account for varying effectiveness of content items in encouraging users to perform interactions, for each content item, the online concierge system selects users for a holdout group. A content item is not displayed to users in the holdout group selected for the content item, while the content item is displayed to users who are not in the holdout group. In various embodiments, the online concierge system selects users for holdout groups for different content items, so a user is in a holdout group for a set of content items and is not in a holdout group for content items outside of the set. For example, the online concierge system selects a content item and randomly or pseudo-randomly selects users for inclusion in a holdout group for the content item. In various embodiments, the online concierge system selects users for inclusion in holdout groups for different content items so different holdout groups for different content items include different users (e.g., at least a threshold number of users in a holdout group for a content item differ from users in a holdout group for another content item). Additionally, the online concierge system selects users for inclusion in holdout groups, so each user is included in a specified percentage of holdout groups. The online concierge system stores information identifying each content item and identifiers of each user in a holdout group for a corresponding content item, allowing the online concierge system to maintain information identifying users to whom a content item is not to be displayed.

Subsequently, the online concierge system identifies opportunities to display content items to various users. For an opportunity to display content items to a user, the online concierge system determines content items for which the user is included in a holdout group and withholds display of content items for which the user is included in a holdout group. Hence, the online concierge system selects one or more content items for display to a user via an identified opportunity from content items for which the user is not included in a corresponding holdout group. By withholding display of content items to users in a corresponding holdout group and displaying content items to users who are nor in corresponding holdout groups for the content items, the online concierge system maintains a number of users to whom different content items were not displayed.

The online concierge system obtains information describing user interactions after the identified opportunities to display content. For example, the online concierge system receives an interaction from a user after identifying an opportunity to display content items to the user and stores information describing the received interaction in association with the user. Further, the online concierge system stores information identifying a content item displayed to the user via the opportunity identified for the user. In various embodiments, the online concierge system stores a time when a content item was displayed to a user via an identified opportunity and stores a time when an interactions was received from the user after the identified opportunity. The holdout groups for various content items allow the online concierge system to obtain information describing interactions by users after a content item was displayed via an identified opportunity as well as describing interactions by users to whom the content item was not displayed via the identified opportunity.

From the obtained interactions for each user, the online concierge system determines, for each user, a rate at which the user performs an interaction when the user is included in a holdout group and a rate at which the user performs the interaction after a content item is displayed to the user. This allows the online concierge system to determine a rate at which the user performs an interaction without a content item being displayed to the user from the content items including the user in a corresponding holdout group, so the online concierge system determines how often the user performs the action without encouragement or enticement from a content item displayed to the user. In various embodiments, the online concierge system determines a value for each user based on a number of times the user performs an interaction when the user is not displayed a content item (i.e., when the user is in a holdout group for the content item) and a number of times the user performs the interaction when the content item is displayed to the user. For example, the value for a user is determined as a rate at which the user performs an interaction when the user is included in a holdout group and the rate at which the user performs the interaction after a content item is displayed to the user. For example, the value is a difference between an average rate at which the user performs the interaction after a content item is displayed to the user and an average rate at which the user performs the interaction when the user is included in a holdout group, so no content item is displayed to the user. The difference between the average rate at which the user performs the interaction after a content item is displayed to the user and an average rate at which the user performs the interaction when a content item is not displayed to the user provides the online concierge system with a measure of influence of displaying content items to the user on the user performing an interaction by accounting for the user performing the interaction without being displayed a content item and for the user performing the interaction after a content item is displayed to the user. Hence, the value determined for a user provides an indication of an effectiveness of displaying content items to the user in the user performing the interaction.

In some embodiments, the interaction is inclusion of an item identified by a content item in an order. Hence, the online concierge system determines a difference between a rate at which the user includes the item in orders received by the online concierge system when no content item identifying the user is displayed to the user and a rate at which the user includes the item in orders received by the online concierge system when a content item identifying the item is displayed to the user. The online concierge system accounts for prices of items in content items displayed to users in some embodiments when determining the value for the user in some embodiments. In these embodiments, the online concierge system retrieves a price of each item identified by each of at least a set of the obtained content items. For each of the items of the set, the online concierge system determines a product of a price of the item and the difference between the average rate at which the user performs the interaction (e.g., include the item in an order) after a content item is displayed to the user and an average rate at which the user performs the interaction (e.g., include the item in the order) when a content item is not displayed to the user. The online concierge system determines the value for the user as a mean, median, mode, or other statistical measure of the products of the prices of each item of the set and the difference between the average rate at which the user performs the interaction (e.g., include the item in an order) after a content item is displayed to the user and an average rate at which the user performs the interaction (e.g., include the item in the order) when a content item is not displayed to the user. In such embodiments accounting for prices of items, the value for a user represents a value of interactions by the user when content items are displayed to the user.

In various embodiments, the training data identifies a combination of a user and a content item and applies the label identifying the value determined for the user to the combination of the user and the content item. Including the content item in the training data along with the user and the label of the value for the user allows the user interaction model to account for attributes of content items when determining a likelihood of the user performing an interaction after a content item is displayed to the user. In various embodiments, the combination of the user and the content item in the training data includes a content item displayed to the user or includes a content item for which the user was included in a corresponding holdout group.

From the values determined for users, the online concierge system generates training data for a user interaction model, which is a neural network in various embodiments. The training data includes users labeled with the value determined for the user. Additionally, in some embodiments, the training data includes a pair of a user and a content item labeled with the value determined, allowing the user interaction model to account for attributes of a content item, as well as characteristics of a user. In various embodiments, the user interaction model comprises a user interaction network comprising a neural network with a plurality of layers. The online concierge system applies the user interaction model to each of a plurality of users of the training data. For a user of the training data, application of the user interaction model to the user generates a predicted value of the user indicating a difference between a rate at which the user performs the interaction after a content item is displayed to the user and an average rate at which the user performs the interaction when a content item is not displayed to the user. The online concierge system determines an error term from a difference between the label applied to the user of the training data and the predicted probability of the user performing the interaction when content items are displayed to the user. The error term may be generated through any suitable loss function, or combination of loss functions, in various embodiments. For example, the loss function is a mean squared error between a predicted probability of a user of the training data performing an interaction by the user interaction model and a label applied to the corresponding user of the training data. However, in other embodiments, any loss function or combination of loss functions, may be applied to the predicted value of the user of the training data indicating a difference between the rate at which the user performs the interaction after one or more content items are displayed to the user and an average rate at which the user performs the interaction when a content item is not displayed to the user and the label applied to the corresponding user of the training data to generate the error term.

The online concierge system repeatedly backpropagates the one or more error terms from the label applied to a user of the training data and the predicted probability of the user performing an interaction after one or more content items are displayed to the user through the layers of the user interaction network. One or more parameters of the user interaction network are modified through any suitable technique from the backpropagation of the one or more error terms through the layers of the user interaction network. For example, weights between nodes of the user interaction network, such as nodes in different layers of the user interaction network, are modified to reduce the one or more error terms. The backpropagation of the one or more error terms is repeated by the online concierge system until the one or more loss functions satisfy one or more criteria. For example, the one or more criteria specify conditions for when the backpropagation of the one or more error terms through the layers of the user interaction network is stopped. In some embodiments, the online concierge system uses gradient descent or any other suitable process to minimize the one or more error terms in various embodiments.

In response to the one or more loss functions satisfying the one or more criteria and the online concierge system stopping the backpropagation of the one or more error terms, the online concierge system stores the set of parameters for the layers of the user interaction network. For example, the online concierge system stores the weights of connections between nodes in the user interaction network as the set of parameters of the user interaction network in a non-transitory computer readable storage medium. Hence, training of the user interaction model allows the online concierge system to generate and to store a neural network that generates a predicted value indicating a difference between a rate at which the user performs an interaction after a content item is displayed to the user and an average rate at which the user performs the interaction when the content item is not displayed to the user.

After training and storing the user interaction model, when the online concierge system identifies an additional opportunity to display one or more content items to a user (e.g., a user who is not included in the training data), the online concierge system determines a predicted value of the user when a content item is displayed to the user by applying the user interaction model to information about the user for whom the additional opportunity was identified. The predicted value indicates a difference between a rate at which the user performs an interaction after the content item is displayed to the user and an average rate at which the user performs the interaction when the content item is not displayed to the user. Based on the determined value, the online concierge system determines whether to display one or more content items to the user via the additional opportunity. For example, the online concierge system selects and displays a content item to the user via the additional opportunity in response to the predicted value of the user equaling or exceeding a threshold, while withholding display of one or more content items to the user in response to the predicted value being less than the threshold. In other embodiments, the online concierge system applies the user interaction model to each of a set of users and ranks the users of the set based on their corresponding predicted values. In response to the user for whom the additional opportunity to display one or more content items is identified having at least a threshold position in the ranking, the online concierge system displays a content item to the user, while preventing display of one or more content items to users having less than the threshold position in the ranking.

In embodiments where the user interaction model accounts for attributes of content items as well as characteristics of a user, the online concierge system supplies the user interaction model to different combinations of users and content items, generating predicted values indicating a difference between a rate at which the user performs the interaction after a content item is displayed to the user and an average rate at which the user performs the interaction when a content item is not displayed to the user. The online concierge system selects a content item for display to the user resulting in a maximum predicted value of the user, while in other embodiments the online concierge system ranks the content items based on their corresponding values for a user selects a content item for display to the user having at least a threshold position in the ranking. Hence, application of the user interaction model allows the online concierge system to select a content item for display to a user that has at least a threshold influence on the user to subsequently perform the interaction.

This allows the online concierge system to more efficiently display content items to users who are more likely to perform an interaction after being displayed with the content items. As the online concierge system receives an increased number of interactions from users through orders placed through the online concierge system, the online concierge system is able to train the user interaction model to more accurately predict rates at which users perform an interaction after one or more content items are displayed. This allows the online concierge system to more efficiently display content items to users who are more likely to subsequently perform an interaction, increasing effectiveness of display of a content item in causing user interaction.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
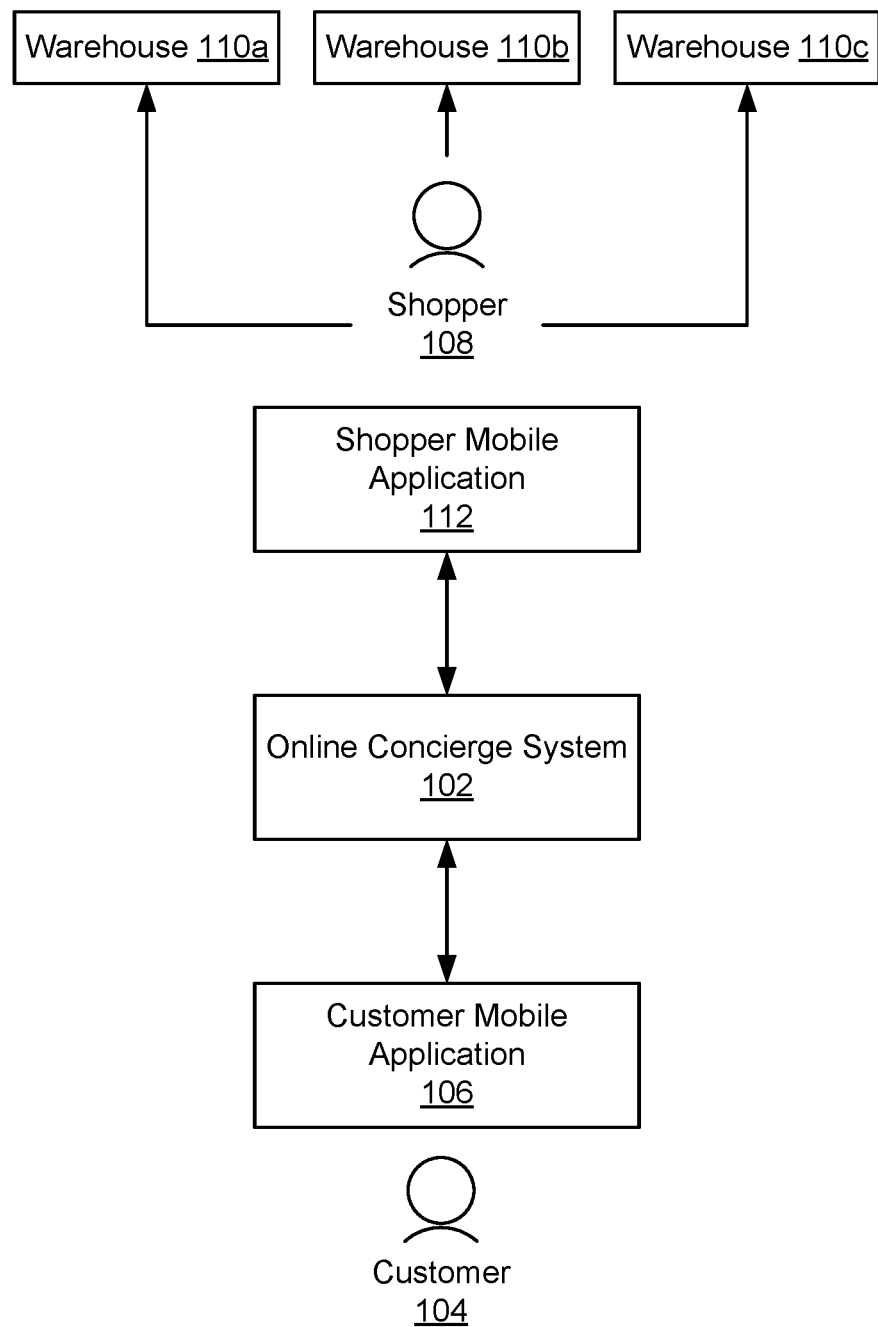
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
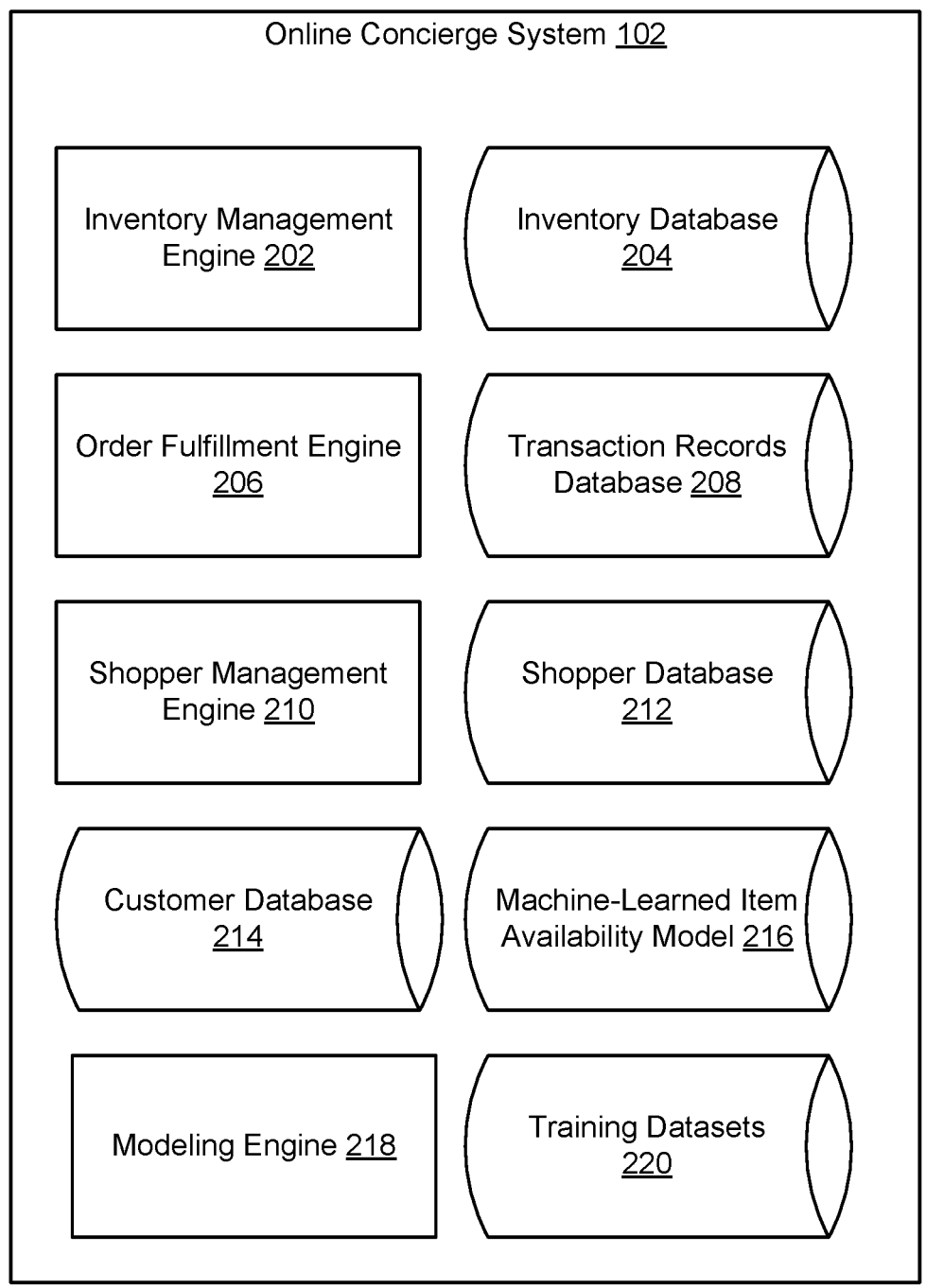
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. different levels in the taxonomy providing different levels of specificity about items included in the levels. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 leverages a taxonomy of items maintained by the inventory management engine 202 to simplify order creation for a user. In various embodiments, the order fulfillment engine 206 receives a generic item description for inclusion in an order from a user and selects a generic item description from a taxonomy maintained for a warehouse 110 identified by the order. From the taxonomy, the order fulfillment engine 206 selects a set of items associated with the received generic item description. The order fulfillment engine 206 selects an item from the set of items based on one or more criteria. For example, the order fulfillment engine 206 applies a trained purchase model to each item of the set, determining a probability of the user purchasing each item of the set. Based on the determined probabilities, the order fulfillment engine 206 selects an item from the set. The order fulfillment engine 206 generates an interface for display to the user, such as through the customer mobile application 106 that is populated with information identifying the selected item, simplifying inclusion of an item in the order by allowing information identifying the order to include a generic description of an item, from which the order fulfillment engine 206 selects a specific item for inclusion in the order. This simplifies input provided by the user to create an order.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

Additionally, the modeling engine 216 trains and stores a user interaction model, further described below in conjunction with FIGS. 4 and 5. The user interaction model determines a probability of a user performing an interaction after a content item is displayed to the user, providing a measure of an amount of influence of a content item on interactions performed by the user. In various embodiments, the user interaction model is a neural network including multiple layers, such as described below in conjunction with FIG. 4. To train the user interaction model, for various content items obtained by the online concierge system 102, the modeling engine 216 identifies a holdout group of users of the online concierge system 102. Users in a holdout group for a content item are not presented with the content item, while users outside of the holdout group are capable of being presented with the content item. As further described below in conjunction with FIG. 5, the modeling engine 216 generates the holdout groups so each user is included in holdout groups for different content items. As content items are displayed to users via the online concierge system 102, the transaction records database 208 stores information describing interactions by users and content items displayed to the users. From the interactions by users, the modeling engine 216 generates values for different users based on rates at which users perform an interaction after a content item is displayed and rates at which users perform the interaction when content items are not displayed to the users. and applies a value for a user as a label to information identifying the user as training data that is stored in the training datasets 220. As further described below in conjunction with FIG. 5, the modeling engine 216 applies the user interaction model to the training data and subsequently stores the trained user interaction model.

When the online concierge system 102 identifies an opportunity to display one or more content items to a user after training the user interaction model, the modeling engine 216 applies the trained user interaction model to information describing the user to determine a value for the user indicating a difference between a rate at which the user performs an interaction after a content item is displayed to the user via the identified opportunity and an average rate at which the user performs the interaction when a content item is not displayed to the user via the identified opportunity. In some embodiments, the modeling engine 216 applies the trained user interaction model to a combination of information describing the user and characteristics of a content item to determine a predicted difference between a rate at which the user performs the interaction after a content item is displayed to the user and an average rate at which the user performs the interaction when a content item is not displayed to the user. Based on values for the user, the modeling engines 216 determines whether to display a content item to the user via the identified opportunity, as further described below in conjunction with FIG. 5.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the training datasets 220 include training data based on interactions performed by users of the online concierge system 102 and display of content items to the users by the online concierge system 102. As further described below in conjunction with FIG. 5, the training data includes information identifying a user and a value based on interactions performed by the user. In various embodiments, the training data is information identifying a user and a label identifying the value corresponding to the user. For example, the value is a difference between an average rate at which the user performed an interaction when one or more content items were displayed to the user and an average rate at which the user performed the interaction without display of one or more content items to the user. In various embodiments, the training data also includes characteristics of content items displayed to one or more users, such as characteristics of a content item for which a user is included in a holdout group or characteristics of a content item displayed to a user.

Additionally, the modeling engine 218 maintains a trained purchase model that outputs a probability of the user purchasing an item. The trained purchase model accounts for times when the user previously purchased an item, such as a relative time from a previously received order including the item to a time when the model is applied, as well as attributes of the item (e.g., a type of the item, a quantity or an amount of the item that was previously purchased, a brand of the item). The trained purchase model may include a decay constant that decreases a weighting of purchases of the items over time, so purchases of the item at longer time intervals from the time when the trained purchase model is applied have lower weights than weights of purchases at the item at shorter time intervals from the time when the trained purchase model is applied. Additionally, the trained purchase model accounts for a frequency with which the user purchases an item, which increases a likelihood of the user purchasing an item if the user more frequently purchases the item. Other example factors used by the trained purchase model to determine the likelihood of a user purchasing an item include: a time interval between prior orders including the item received from the user, a frequency with which the item is included in prior orders received from the user, times when orders including the item were previously received from the user, preferences of the user, and any other suitable information. The trained purchase model may be trained using any suitable method or combination of methods (e.g., supervised learning, unsupervised learning, semi-supervised learning, etc.).

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
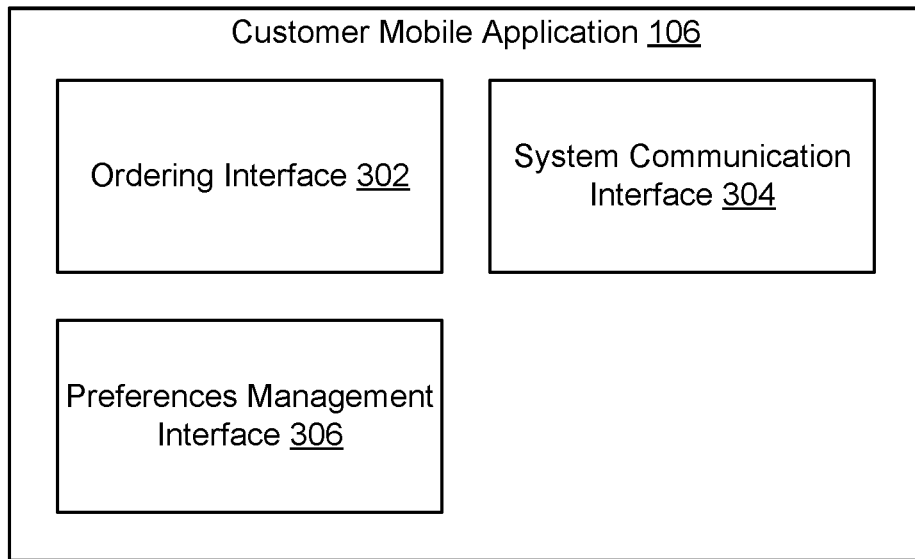
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
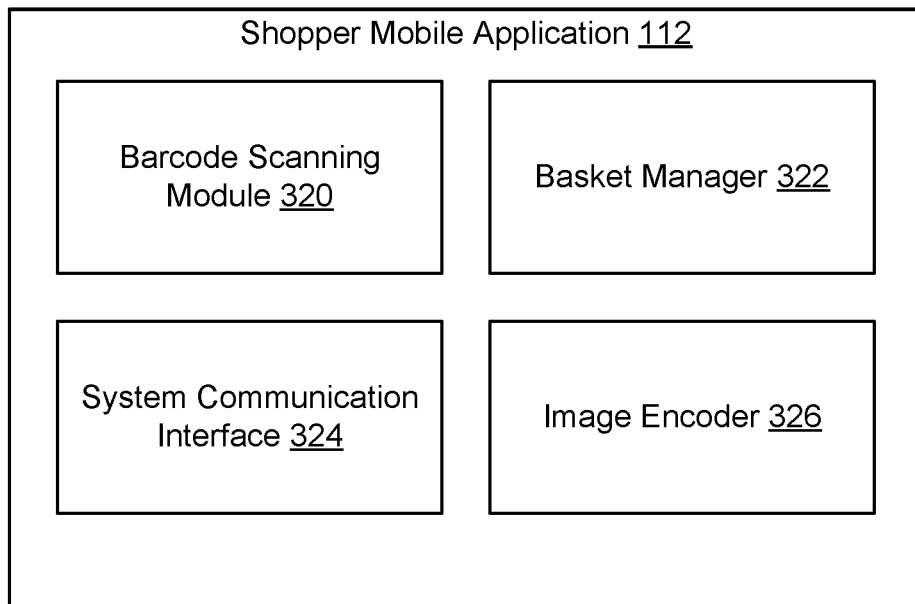
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Example Neural Network

Figure 4:
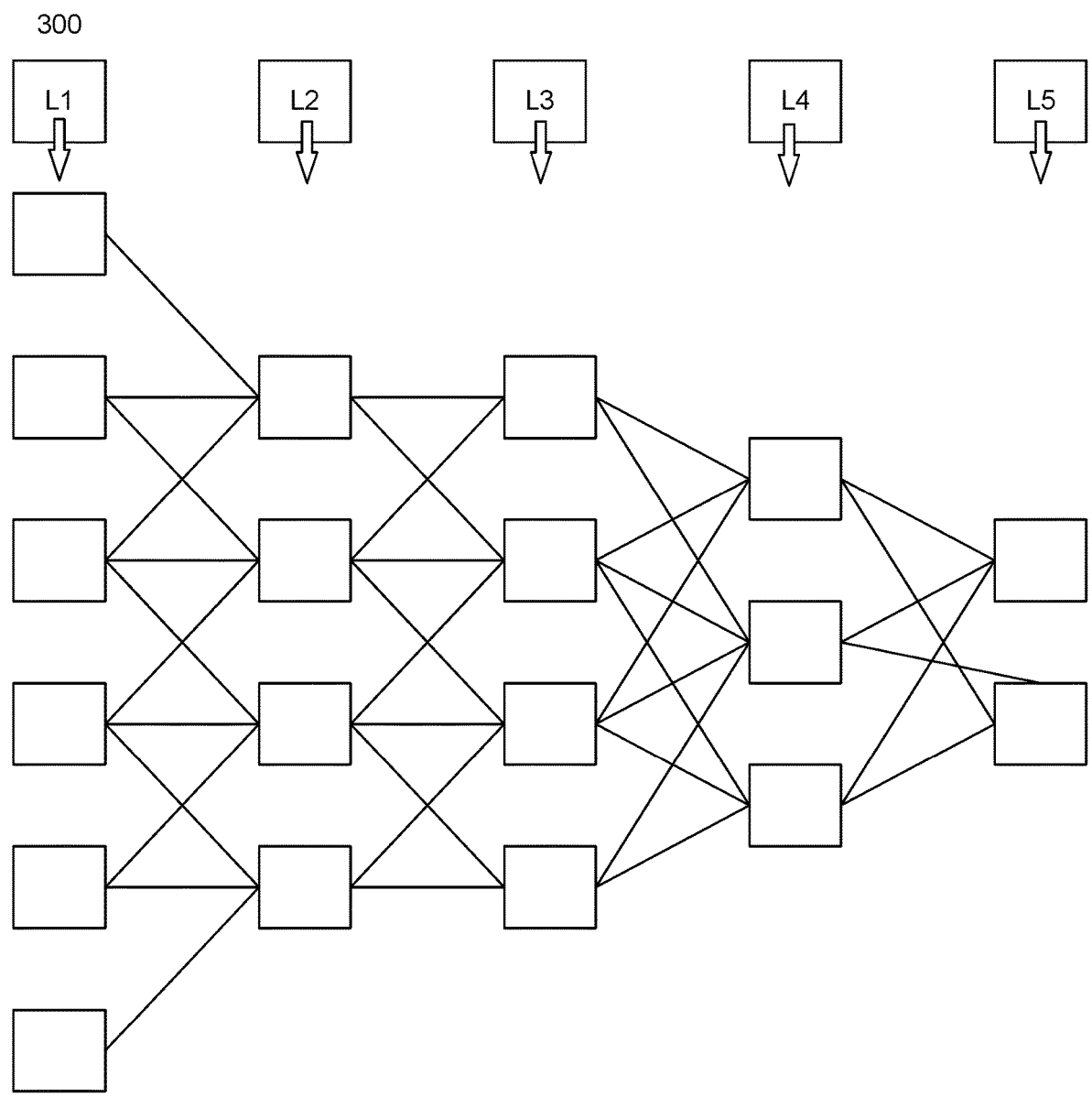
FIG. 4 is an example neural network model that may be used to generate a user interaction model that generates a value indicating an influence of displaying a content item to a user on the user subsequently performing an interaction, according to one embodiment.

FIG. 4 shows an example neural network model 400 that may be used to generate a user interaction model that generates a value indicating an influence of displaying a content item to a user on the user subsequently performing an interaction. The neural network model 400 shown in FIG. 4, also referred to as a deep neural network, comprises a plurality of layers (e.g., layers L1 through L5), with each of the layers including one or more nodes. Each node has an input and an output and is associated with a set of instructions corresponding to the computation performed by the node. The set of instructions corresponding to the nodes of the neural network may be executed by one or more computer processors.

Each connection between nodes in the neural network model 400 may be represented by a weight (e.g., numerical parameter determined through a training process). In some embodiments, the connection between two nodes in the neural network model 400 is a network characteristic. The weight of the connection may represent the strength of the connection. In some embodiments, connections between a node of one level in the neural network model 400 are limited to connections between the node in the level of the neural network model 400 and one or more nodes in another level that is adjacent to the level including the node. In some embodiments, network characteristics include the weights of the connection between nodes of the neural network. The network characteristics may be any values or parameters associated with connections of nodes of the neural network.

A first layer of the neural network 400 (e.g., layer L1 in FIG. 4) may be referred to as an input layer, while a last layer (e.g., layer L5 in FIG. 4) may be referred to an output layer. The remaining layers (layers L2, L3, L4) of the neural network 400 are referred to are hidden layers. Nodes of the input layer are correspondingly referred to as input nodes; nodes of the output layer are referred to as output nodes, and nodes of the hidden layers are referred to as hidden nodes. Nodes of a layer provide input to another layer and may receive input from another layer. For example, nodes of each hidden layer (L2, L3, L4) are associated with two layers (a previous layer and a next layer). A hidden layer (L2, L3, L4) receives an output of a previous layer as input and provides an output generated by the hidden layer as an input to a next layer. For example, nodes of hidden layer L3 receive input from the previous layer L2 and provide input to the next layer L4.

The layers of the neural network 400 are configured to identify one or more embeddings of a user identified to the neural network 400. For example, an output of the last hidden layer of the neural network 400 (e.g., the last layer before the output layer, illustrated in FIG. 4 as layer L4) indicates one or more embeddings of the user. An embedding of the user may be expressed as a set of vectors (e.g., a 256-bit vector) indicating features of the identified user to form a feature vector for the identified user. In other embodiments, the output layer of the neural network 400 may output one or more scores associated with an embedding. For example, an output score corresponds to a probability that the user will perform an interaction after a content item is displayed to the user. The neural network 400 may correspond to a specific interaction, and the online concierge system 102 may maintain multiple neural networks 400 that each correspond to a specific interaction, allowing the online concierge system 102 to determine probabilities of a user performing different specific interactions using different neural networks 400.

In some embodiments, the weights between different nodes in the neural network 400 may be updated using machine learning techniques. As further described below in conjunction with FIG. 5, the neural network 400 may be provided with training data identifying users with a label applied to each identified user. The label applied to a user identifying a difference between interactions by a user after one or more content items are displayed to the user and interactions by the user when none of the one or more content items are displayed to the user. In some embodiments, the training data comprises a set of feature vectors corresponding to a specific number or specific percentage of users of the online concierge system 102; each feature vector of the training set data associated with a corresponding label identifying users with a label applied to each identified user. The label applied to a user identifying a difference between interactions by a user after one or more content items are displayed to the user and interactions by the user when none of the one or more content items are displayed to the user. Features of user of the training set determined by the neural network 400 are compared to the difference between interactions by a user after one or more content items are displayed to the user and interactions by the user when none of the one or more content items are displayed to the user with which each user of the training data is labeled, and the comparison is used to modify one or more weights between different nodes in the neural network 400.

Figure 5:
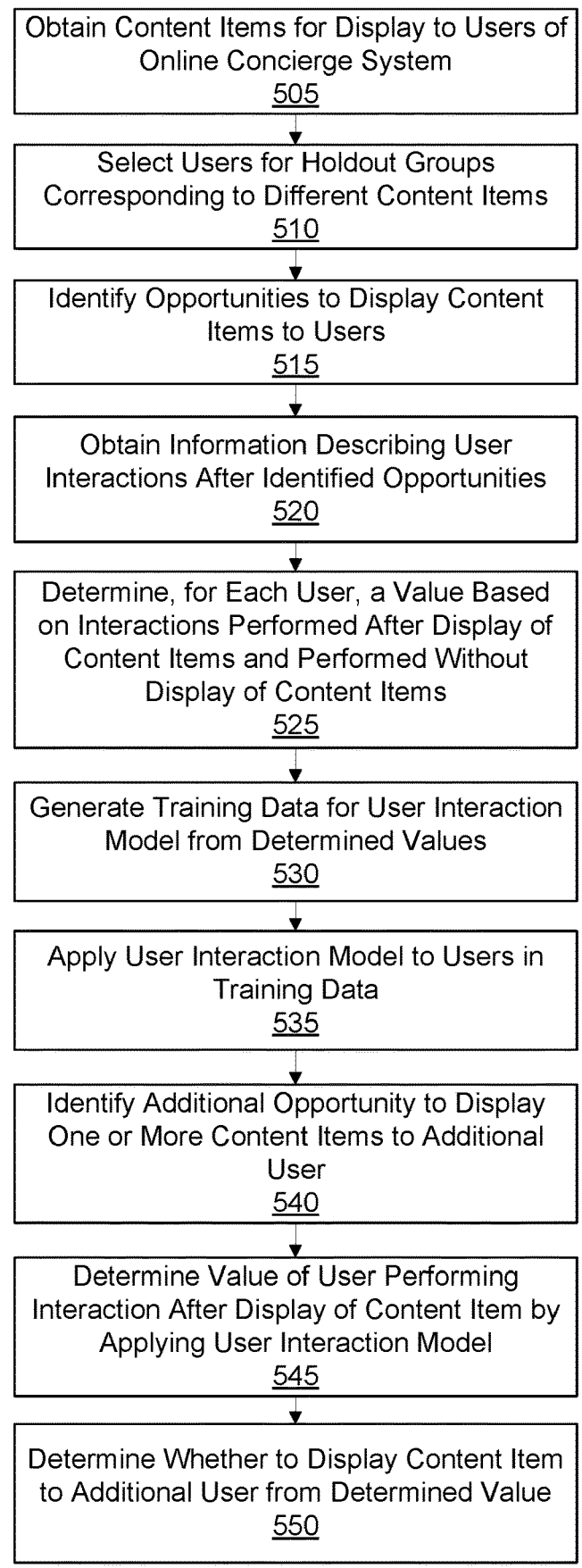
FIG. 5 is a flowchart of a method for an online concierge system determining a value describing an influence of displaying a content item to a user on the user subsequently performing an interaction, in accordance with an embodiment.

Determining Effect of Displaying a Content Item to a User in Causing an Interaction by the User FIG. 5 is a flowchart of one embodiment of a method for an online concierge system 102 determining a value describing an influence of displaying a content item to a user on the user subsequently performing an interaction. In various embodiments, the method includes different or additional steps than those described in conjunction with FIG. 5. Further, in some embodiments, the steps of the method may be performed in different orders than the order described in conjunction with FIG. 5. The method described in conjunction with FIG. 4 may be carried out by the online concierge system 102 in various embodiments.

An online concierge system 102 obtains 505 content items for display to users of the online concierge system 102. The content items may be received from one or more third party systems external to the online concierge system 102 (e.g., a website in a domain different from a domain of the online concierge system 102, such as a website corresponding to a warehouse 110) or may be generated by the online concierge system 102. For example, a content item from a third party system identifies a warehouse 110 and an item for purchase from the warehouse. In another example, the online concierge system 102 generates content items for one or more items offered for purchase from a warehouse 110. A content item may include one or more prompts for the user to perform one or more interactions with the online concierge system 102. Example interactions include adding an item identified by the content item to an order, viewing information about an item identified by the content item, accessing a warehouse 110 corresponding to the order, or any other suitable interaction by the user with the online concierge system 102.

The online concierge system 102 presents content items to users to entice or to encourage the users to perform interactions. However, different users differently respond to being presented with content items, with certain users more likely to perform interactions after being presented with content items than other users. Similarly, different content items may have different amounts of influence on users.

To account for varying effectiveness of content items in encouraging users to perform interactions, for each content item, the online concierge system 102 selects 510 users for a holdout group. A content item is not displayed to users in the holdout group selected for the content item, while the content item is displayed to users who are not in the holdout group. In various embodiments, the online concierge system 102 selects 510 users for holdout groups for different content items so a user is in a holdout group for a set of content items and is not in a holdout group for content items outside of the set. For example, the online concierge system 102 selects a content item and randomly or pseudo-randomly selects 510 users for inclusion in a holdout group for the content item. In various embodiments, the online concierge system 102 selects 510 users for inclusion in holdout groups for different content items so different holdout groups for different content items include different users (e.g., at least a threshold number of users in a holdout group for a content item differ from users in a holdout group for another content item). Additionally, the online concierge system 102 selects 510 users for inclusion in holdout groups so each user is included in a specified percentage of holdout groups. The online concierge system 102 stores information identifying each content item and identifiers of each user in a holdout group for a corresponding content item, allowing the online concierge system 102 to maintain information identifying users to whom a content item is not to be displayed.

Subsequently, the online concierge system 102 identifies 515 opportunities to display content items to various users. For an opportunity to display content items to a user, the online concierge system 102 determines content items for which the user is included in a holdout group and withholds display of content items for which the user is included in a holdout group. Hence, the online concierge system 102 selects one or more content items for display to a user via an identified opportunity from content items for which the user is not included in a corresponding holdout group. By withholding display of content items to users in a corresponding holdout group and displaying content items to users who are nor in corresponding holdout groups for the content items, the online concierge system 102 maintains a number of users to whom different content items were not displayed.

The online concierge system 102 obtains 520 information describing user interactions after the identified opportunities to display content. For example, the online concierge system 102 receives an interaction from a user after identifying 415 an opportunity to display content items to the user and stores information describing the received interaction in association with the user. Further, the online concierge system 102 stores information identifying a content item displayed to the user via the opportunity identified 515 for the user. In various embodiments, the online concierge system 102 stores a time when a content item was displayed to a user via an identified opportunity and stores a time when an interactions was received from the user after the identified opportunity. The holdout groups for various content items allow the online concierge system 102 to obtains 520 information describing interactions by users after a content item was displayed via an identified opportunity as well as describing interactions by users to whom the content item was not displayed via the identified opportunity.

In various embodiments, the online concierge system 102 determines 525 a value for each user based on a number of times the user performs an interaction when the user is not displayed a content item (i.e., when the user is in a holdout group for the content item) and a number of times the user performs the interaction when the content item is displayed to the user. For example, the value for a user is determined 525 as a rate at which the user performs an interaction when the user is included in a holdout group and the rate at which the user performs the interaction after a content item is displayed to the user. From the obtained interactions for each user, the online concierge system 102 determines 525, for each user, a rate at which the user performs an interaction when the user is included in a holdout group and a rate at which the user performs the interaction after a content item is displayed to the user. This allows the online concierge system 102 to determine a rate at which the user performs an interaction without a content item being displayed to the user from the content items including the user in a corresponding holdout group, so the online concierge system 102 determines how often the user performs the action without encouragement or enticement from a content item displayed to the user. The value may be a difference between an average rate at which the user performs the interaction after a content item is displayed to the user and an average rate at which the user performs the interaction when the user is included in a holdout group, so no content item is displayed to the user. The difference between the average rate at which the user performs the interaction after a content item is displayed to the user and an average rate at which the user performs the interaction when a content item is not displayed to the user provides the online concierge system 102 with a measure of influence of displaying content items to the user on the user performing an interaction by accounting for the user performing the interaction without being displayed a content item and for the user performing the interaction after a content item is displayed to the user. Hence, the value determined 525 for a user provides an indication of an effectiveness of displaying content items to the user in the user performing the interaction.

In various embodiments, the training data identifies a combination of a user and a content item and applies the label identifying the value determined 525 for the user to the combination of the user and the content item. Including the content item in the training data along with the user and the label of the value for the user allows the user interaction model to account for attributes of content items when determining a likelihood of the user performing an interaction after a content item is displayed to the user. In various embodiments, the combination of the user and the content item in the training data includes a content item displayed to the user or includes a content item for which the user was included in a corresponding holdout group.

In some embodiments, the interaction is inclusion of an item identified by a content item in an order. Hence, the online concierge system 102 determines 525 a difference between a rate at which the user includes the item in orders received by the online concierge system 102 when no content item identifying the user is displayed to the user and a rate at which the user includes the item in orders received by the online concierge system 102 when a content item identifying the item is displayed to the user. The online concierge system 102 accounts for prices of items in content items displayed to users in some embodiments when determining 525 the value for the user in some embodiments. In these embodiments, the online concierge system 102 retrieves a price of each item identified by each of at least a set of the obtained content items. For each of the items of the set, the online concierge system 102 determines a product of a price of the item and the difference between the average rate at which the user performs the interaction (e.g., include the item in an order) after a content item is displayed to the user and an average rate at which the user performs the interaction (e.g., include the item in the order) when a content item is not displayed to the user. The online concierge system 102 determines 525 the value for the user as a mean, median, mode, or other statistical measure of the products of the prices of each item of the set and the difference between the average rate at which the user performs the interaction (e.g., include the item in an order) after a content item is displayed to the user and an average rate at which the user performs the interaction (e.g., include the item in the order) when a content item is not displayed to the user. In such embodiments accounting for prices of items, the value for a user represents a value of interactions by the user when content items are displayed to the user.

From the values determined 525 for users, the online concierge system 102 generates 530 training data for a user interaction model, as further described above in conjunction with FIG. 4. The training data includes users labeled with the value determined 525 for the user. Additionally, in some embodiments, the training data includes a pair of a user and a content item labeled with the value determined 530, allowing the user interaction model to account for attributes of a content item, as well as characteristics of a user. In various embodiments, the user interaction model comprises an interaction network that is a neural network with a plurality of layers, as further described above in conjunction with FIG. 4. The online concierge system 102 applies 535 the user interaction model to each of a plurality of users of the training data. For a user of the training data, application of the user interaction model to the user generates a predicted value of the user indicating a difference between a rate at which the user performs an interaction after a content item is displayed to the user and an average rate at which the user performs the interaction when a content item is not displayed to the user. The online concierge system 102 determines an error term from a difference between the label applied to the user of the training data and the predicted probability of the user performing the interaction when content items are displayed to the user. The error term may be generated through any suitable loss function, or combination of loss functions, in various embodiments. For example, the loss function is a mean squared error between a predicted probability of a user of the training data performing an interaction by the user interaction model and a label applied to the corresponding user of the training data. However, in other embodiments, any loss function or combination of loss functions, may be applied to the predicted value of the user of the training data and the label applied to the corresponding user of the training data to generate the error term.

The online concierge system 102 repeatedly backpropagates the one or more error terms from the label applied to a user of the training data and the predicted value of the user, which comprises a difference between a rate at which the user performs an interaction after one or more content items are displayed to the user and an average rate at which the user performs the interaction when a content item is not displayed to the user, through the layers of the user interaction network. One or more parameters of the user interaction network are modified through any suitable technique from the backpropagation of the one or more error terms through the layers of the user interaction network. For example, weights between nodes of the user interaction network, such as nodes in different layers of the user interaction network, are modified to reduce the one or more error terms. The backpropagation of the one or more error terms is repeated by the online concierge system 102 until the one or more loss functions satisfy one or more criteria. For example, the one or more criteria specify conditions for when the backpropagation of the one or more error terms through the layers of the user interaction network is stopped. In some embodiments, the online concierge system 102 uses gradient descent or any other suitable process to minimize the one or more error terms in various embodiments.

In response to the one or more loss functions satisfying the one or more criteria and the online concierge system 102 stopping the backpropagation of the one or more error terms, the online concierge system 102 stores the set of parameters for the layers of the user interaction network. For example, the online concierge system 102 stores the weights of connections between nodes in the user interaction network as the set of parameters of the user interaction network in a non-transitory computer readable storage medium. Hence, training of the user interaction model allows the online concierge system 102 to generate and to store a neural network that generates a value of a user representing a difference between a rate at which the user performs an interaction after one or more content items are displayed to the user and an average rate at which the user performs the interaction when a content item is not displayed to the user.

The user interaction model may be any machine learning model, such as a neural network, boosted tree, gradient boosted tree, or random forest model in various embodiments. For example, the online concierge system 102 generates the user interaction model as a tree based ensemble model combining multiple decision trees. In various embodiments, the online concierge system 102 selects at least a set of examples of the training data (which each include a combination of a user and a content item and applies the label identifying the value determined 525 for the user to the combination of the user and the content item) and trains a decision tree on each example of the set by applying a decision tree to each example and comparing a predicted value for the user from application of the decision tree to an example to a label applied to the example. For example, the decision tree iteratively selects features of an example of the training data and selects a feature causing a loss function to satisfy one or more criteria, for example a feature minimizing a squared error between a predicted distance from the decision tree and a label applied to the example of the training data. The online concierge system 102 sums the loss function over each example of the set to determine a total loss function and selects a feature having a minimum total loss function across the examples of the training data. Subsequently, the online concierge system 102 splits the examples of the training data into subsets having different values for the selected feature and recursively generates new nodes of the decision tree using the subsets of examples until one or more halting criteria are satisfied (e.g., each leaf node of a decision tree includes a minimum number of examples of the training data).

In some embodiments, the online concierge system 102 trains multiple decision trees in parallel from the examples of the training data, with a different subset of examples of the training data used to train different decision trees, with each decision tree selecting a different set of features of the training data. The subset of the training data used to train a decision tree is grouped based on values for the selected set of features for the decision tree and new nodes of the decision tree are generated using the groups of examples until one or more halting criteria are satisfied (e.g., each leaf node of a decision tree includes a minimum number of examples of the training data). The user interaction model comprises the set of trained decision trees, with individual decision trees predicting a value of a user that indicates a difference in a rate of a user performing an interaction when one or more content items are displayed to the user and a rate of the user performing the interaction when no content items are displayed to the user and the user interaction model outputting a predicted value of the user predicted by at least a threshold number of the decision trees.

As another example, the online concierge system 102 trains multiple decision trees in series, training an initial decision tree as described above and determining a loss function for the initial decision tree based on differences between a predicted distance from the decision tree and a label applied to the example of the training data. For example, the loss function is a squared error function between the predicted value of the user and the label applied to the example of the training data. The online concierge system 102 trains another decision tree based on the results of the loss function for each example of the training data and iteratively trains decision tress, with results of the loss function from a decision tree used to train an immediately subsequent decision tree. The online concierge system 102 iteratively trains decision trees from the results of the loss function from another decision tree until a specific number of decision trees are trained or until another halting condition is satisfied. The output of the user interaction model is a combination (e.g., a sum) of the predicted values of a user output by each of the trained decision trees.

In other embodiments, the online concierge system 102 trains a holdout model to generate a predicted holdout value from examples of the training data corresponding to users to whom a content item was not displayed (i.e., when the user is in a holdout group for the content item) using any of the methods described above. The online concierge system 102 similarly trains a display model to generate a predicted display value for a user from examples of the training data corresponding to users to whom a content item was displayed. The online concierge system 102 determines the user interaction model by combining the holdout model and the display model. For example, the user interaction model in such an implementation generates a predicted value of a user as a difference between a predicted display value from application of the display model to the user and a predicted holdout value from application of the holdout model to the user.

After training and storing the user interaction model, when the online concierge system 102 identifies 540 an additional opportunity to display one or more content items to an additional user, such as a user who is not included in the training data, the online concierge system 102 determines 545 a value of the user by applying the user interaction model to information about the user for whom the additional opportunity was identified 540, with the value of the user indicating a difference between a rate at which the user performs an interaction after one or more content items is displayed to the user and an average rate at which the user performs the interaction when a content item is not displayed to the user. Based on the determined value, the online concierge system 102 determines 550 whether to display one or more content items to the user via the additional opportunity. For example, the online concierge system 102 selects and displays a content item to the user via the additional opportunity in response to the determined value equaling or exceeding a threshold, while withholding display of one or more content items to the user in response to the determined value being less than the threshold. In other embodiments, the online concierge system 102 applies the user interaction model to each of a set of users and ranks the users of the set based on their corresponding values indicating a difference between a rate at which the user performs the interaction after one or more content items are displayed to the user and an average rate at which the user performs the interaction when a content item is not displayed to the user. In response to the additional user for whom the additional opportunity to display one or more content items is identified 540 having at least a threshold position in the ranking, the online concierge system 120 displays a content item to the user, while preventing display of one or more content items to users having less than the threshold position in the ranking. This allows the online concierge system 102 to more efficiently display content items to users who are more likely to perform an interaction after being displayed with the content items.

In embodiments where the user interaction model accounts for attributes of content items as well as characteristics of a user, the online concierge system 102 applies the user interaction model to different combinations of user and content item, generating values of the user after different content items are displayed to the user, with a value for a user and a content item indicating a difference between a rate at which the user performs the interaction after the content item is displayed to the user and an average rate at which the user performs the interaction when the content item is not displayed to the user. The online concierge system 102 selects a content item for display to the user resulting in a maximum value of the user in some embodiments, while in other embodiments the online concierge system 102 ranks the content items based on their corresponding values of the user and selects a content item for display to the user having at least a threshold position in the ranking. Hence, application of the user interaction model allows the online concierge system 102 to select a content item for display to a user that has at least a threshold effect on a rate at which the user subsequently performs the interaction.

As the online concierge system 102 receives an increased number of interactions from users through orders placed through the online concierge system 102, the online concierge system 102 is able to train the user interaction model to more accurately determine differences between rates at which users perform an interaction after one or more content items are displayed. This allows the online concierge system 102 to more efficiently display content items to users who are more likely to subsequently perform an interaction, increasing effectiveness of display of a content item in causing user interaction.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed at a computer system comprising a processor and a computer-readable medium, the computer-implemented method comprising:

displaying one or more content items to a user;
measuring a first number of interactions performed by the user after the one or more content items are displayed to the user;
measuring a second number of interactions performed by the user when none of the one or more content items are displayed to the user;
determining a measured difference between the first number of interactions and the second number of interactions;
training a user interaction network that comprises a plurality of layers of a neural network, wherein training of the user interaction network comprises:
applying the user interaction network to generate a predicted difference associated with the user, the predicted difference indicating a difference between a first predicted number of interactions performed by the user after the one or more content items are displayed to the user and a second predicted number of the interaction performed by the user when none of the one or more content items are displayed to the user, and
backpropagating one or more error terms obtained from one or more loss functions to update a set of parameters of the user interaction network, the backpropagating performed through the neural network and one or more of the error terms based on the measured difference and the predicted difference;
identifying an opportunity to display content items to an additional user;
applying the user interaction network to determine a predicted value of the additional user when a particular content item is displayed to the additional user;
determining, using the predicted value, whether to display the particular content item to the additional user; and
causing, based on determining to display the particular content item to the additional user, the particular content item to be displayed to the additional user.

2. The computer-implemented method of claim 1, wherein measuring the first number of interactions comprises measuring a first average rate at which the user performs an interaction after the one or more content items are displayed to the user, and measuring the second number of interactions comprises measuring a second average rate at which the user performs an interaction after none of the one or more content items are displayed to the user.

3. The computer-implemented method of claim 1, wherein the interactions measured comprise one or more of the following: clicking on a link associated with a content item, performing a search associated with a content item and including, in an order, an item that is presented in a content item.

4. The computer-implemented method of claim 1, wherein training the user interaction network comprises apply a training set to train the user interaction network, the training set comprising measurements of interactions of a plurality of users.

5. The computer-implemented method of claim 4, wherein the additional user is not included in the plurality of users in the training set.

6. The computer-implemented method of claim 1, wherein the computer system corresponds to an online concierge system that suggests one or more items to be added in an order as content items.

7. The computer-implemented method of claim 1, wherein identifying an opportunity to display content items to an additional user comprises identifying a plurality of candidate content items; and
wherein determining, using the predicted value, whether to display the particular content item to the additional user comprises:
generating a ranking of predicted values for the plurality of candidate content items; and
selecting one of the candidate content items as the particular content item to be displayed based on the ranking.

8. The computer-implemented method of claim 1, wherein measuring the first number of interactions comprises measuring the first number of interactions when the user is not in a holdout group, and measuring the second number of interactions comprises measuring the second number of interactions when the user is in a holdout group.

9. A non-transitory computer-readable medium configured to store code comprising instructions, wherein the instructions, when executed by a processor, cause the processors to perform steps comprising:
displaying one or more content items to a user;
measuring a first number of interactions performed by the user after the one or more content items are displayed to the user;
measuring a second number of interactions performed by the user when none of the one or more content items are displayed to the user;
determining a measured difference between the first number of interactions and the second number of interactions;
training a user interaction network that comprises a plurality of layers of a neural network, wherein training of the user interaction network comprises:
applying the user interaction network to generate a predicted difference associated with the user, the predicted difference indicating a difference between a first predicted number of interactions performed by the user after the one or more content items are displayed to the user and a second predicted number of the interaction performed by the user when none of the one or more content items are displayed to the user, and
backpropagating one or more error terms obtained from one or more loss functions to update a set of parameters of the user interaction network, the backpropagating performed through the neural network and one or more of the error terms based on the measured difference and the predicted difference;
identifying an opportunity to display content items to an additional user;
applying the user interaction network to determine a predicted value of the additional user when a particular content item is displayed to the additional user;
determining, using the predicted value, whether to display the particular content item to the additional user; and
causing, based on determining to display the particular content item to the additional user, the particular content item to be displayed to the additional user.

10. The non-transitory computer-readable medium of claim 9, wherein measuring the first number of interactions comprises measuring a first average rate at which the user performs an interaction after the one or more content items are displayed to the user, and measuring the second number of interactions comprises measuring a second average rate at which the user performs an interaction after none of the one or more content items are displayed to the user.

11. The non-transitory computer-readable medium of claim 9, wherein the interactions measured comprise one or more of the following: clicking on a link associated with a content item, performing a search associated with a content item and including, in an order, an item that is presented in a content item.

12. The non-transitory computer-readable medium of claim 9, wherein training the user interaction network comprises apply a training set to train the user interaction network, the training set comprising measurements of interactions of a plurality of users.

13. The non-transitory computer-readable medium of claim 12, wherein the additional user is not included in the plurality of users in the training set.

14. The non-transitory computer-readable medium of claim 9, wherein the computer system corresponds to an online concierge system that suggests one or more items to be added in an order as content items.

15. The non-transitory computer-readable medium of claim 9, wherein identifying an opportunity to display content items to an additional user comprises identifying a plurality of candidate content items; and
wherein determining, using the predicted value, whether to display the particular content item to the additional user comprises:
generating a ranking of predicted values for the plurality of candidate content items; and
selecting one of the candidate content items as the particular content item to be displayed based on the ranking.

16. The non-transitory computer-readable medium of claim 9, wherein measuring the first number of interactions comprises measuring the first number of interactions when the user is not in a holdout group, and measuring the second number of interactions comprises measuring the second number of interactions when the user is in a holdout group.

17. A system comprising:
a processor; and
memory configured to store code comprising instructions, wherein the instructions, when executed by a processor, cause the processors to perform steps comprising:
displaying one or more content items to a user;
measuring a first number of interactions performed by the user after the one or more content items are displayed to the user;

measuring a second number of interactions performed by the user when none of the one or more content items are displayed to the user;

determining a measured difference between the first number of interactions and the second number of interactions;

training a user interaction network that comprises a plurality of layers of a neural network, wherein training of the user interaction network comprises:

applying the user interaction network to generate a predicted difference associated with the user, the predicted difference indicating a difference between a first predicted number of interactions performed by the user after the one or more content items are displayed to the user and a second predicted number of the interaction performed by the user when none of the one or more content items are displayed to the user, and backpropagating one or more error terms obtained from one or more loss functions to update a set of parameters of the user interaction network, the backpropagating performed through the neural network and one or more of the error terms based on the measured difference and the predicted difference;

identifying an opportunity to display content items to an additional user;

applying the user interaction network to determine a predicted value of the additional user when a particular content item is displayed to the additional user;

determining, using the predicted value, whether to display the particular content item to the additional user; and causing, based on determining to display the particular content item to the additional user, the particular content item to be displayed to the additional user.

18. The system of claim 17, wherein measuring the first number of interactions comprises measuring a first average rate at which the user performs an interaction after the one or more content items are displayed to the user, and measuring the second number of interactions comprises measuring a second average rate at which the user performs an interaction after none of the one or more content items are displayed to the user.

19. The system of claim 17, wherein the interactions measured comprise one or more of the following: clicking on a link associated with a content item, performing a search associated with a content item and including, in an order, an item that is presented in a content item.

20. The system of claim 17, wherein identifying an opportunity to display content items to an additional user comprises identifying a plurality of candidate content items; and wherein determining, using the predicted value, whether to display the particular content item to the additional user comprises:

generating a ranking of predicted values for the plurality of candidate content items; and selecting one of the candidate content items as the particular content item to be displayed based on the ranking.

* * * * *